United States Patent
Chen et al.

(10) Patent No.: US 9,281,773 B2
(45) Date of Patent: Mar. 8, 2016

(54) POSITION SENSORLESS STEP-WISE FREEWHEELING CONTROL METHOD FOR SWITCHED RELUCTANCE MOTOR

(71) Applicant: China University of Mining and Technology, Xuzhou (CN)

(72) Inventors: Hao Chen, Xuzhou (CN); Hui Zeng, Xuzhou (CN)

(73) Assignee: China University of Mining and Technology, Jiangsu (CN)

( * ) Notice: Subject to any disclaimer, the term of this patent is extended or adjusted under 35 U.S.C. 154(b) by 110 days.

(21) Appl. No.: 14/344,872

(22) PCT Filed: Jan. 24, 2013

(86) PCT No.: PCT/CN2013/070930
§ 371 (c)(1),
(2) Date: Mar. 13, 2014

(87) PCT Pub. No.: WO2014/063453
PCT Pub. Date: May 1, 2014

(65) Prior Publication Data
US 2014/0340006 A1    Nov. 20, 2014

(30) Foreign Application Priority Data

Oct. 22, 2012  (CN) .......................... 2012 1 0403886

(51) Int. Cl.
H02P 25/08    (2006.01)
(52) U.S. Cl.
CPC ............ *H02P 25/085* (2013.01); *H02P 25/083* (2013.01)

(58) Field of Classification Search
CPC .............................. H02P 25/083; H02P 25/085
USPC ............... 318/254.1, 400.26, 400.28, 400.31, 318/700, 701, 721, 436
See application file for complete search history.

(56) References Cited

U.S. PATENT DOCUMENTS

| | | | | |
|---|---|---|---|---|
| 5,811,954 A * | 9/1998 | Randall | ................ | H02P 25/082 318/400.11 |
| 5,883,485 A * | 3/1999 | Mehlhorn | ............... | H02P 25/08 318/400.12 |
| 6,351,094 B1 * | 2/2002 | Green | ................... | H02P 25/083 318/700 |
| 6,586,903 B2 * | 7/2003 | Moriarty | ............... | H02P 25/083 318/701 |
| 8,125,170 B2 * | 2/2012 | Fahimi | ............... | G01R 27/2611 318/400.34 |

* cited by examiner

*Primary Examiner* — Bentsu Ro
*Assistant Examiner* — Thai Dinh
(74) *Attorney, Agent, or Firm* — Miller Law Group, PLLC

(57) ABSTRACT

A position sensorless step-wise freewheeling control method for a switched reluctance motor having dual switched-mode power converters for each phase doesn't require any additional external hardware, any rotor-position sensor, or storage of flux linkage data of the motor. After the upper and lower tubes of the main switch are switched off, and the phase of the switched reluctance motor enters into a negative voltage forced freewheeling state, the phase current is detected. When the phase current falls to a preset threshold, one of the upper or lower tubes is switched on and the phase enters into a zero voltage natural freewheeling state. When the phase current reaches a peak value, the rotor position becomes the start position of the minimum phase inductance and the rotor position is used as the switch-on position of the main switch. The upper and lower tubes are then switched on.

11 Claims, 2 Drawing Sheets

Figure 1
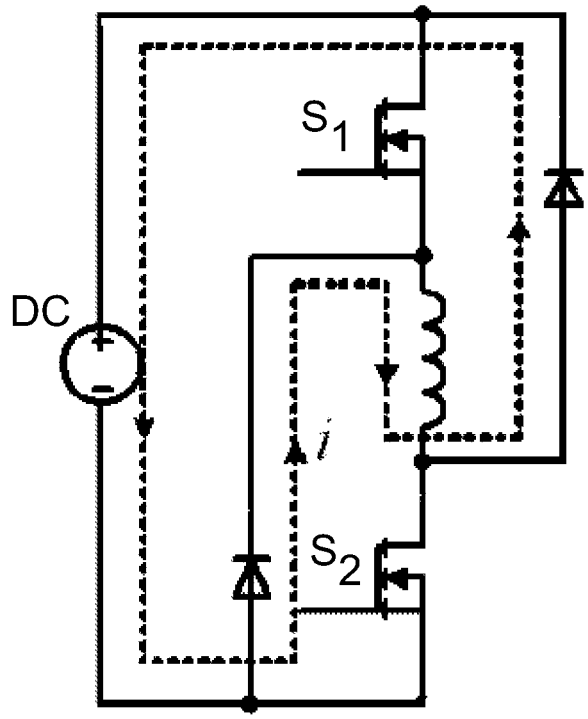
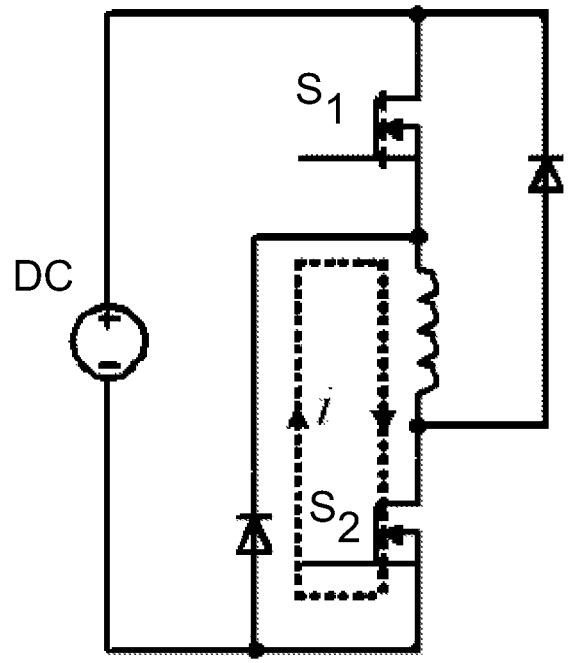
Figure 2

Figure 3
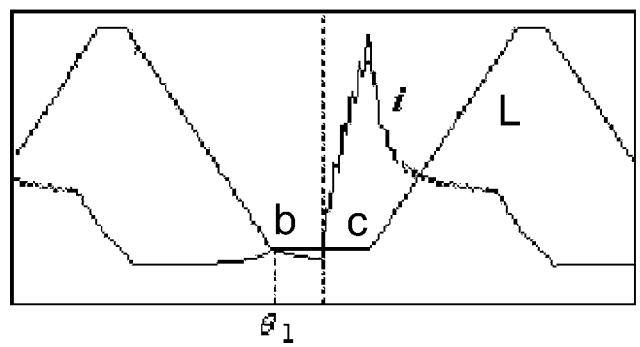
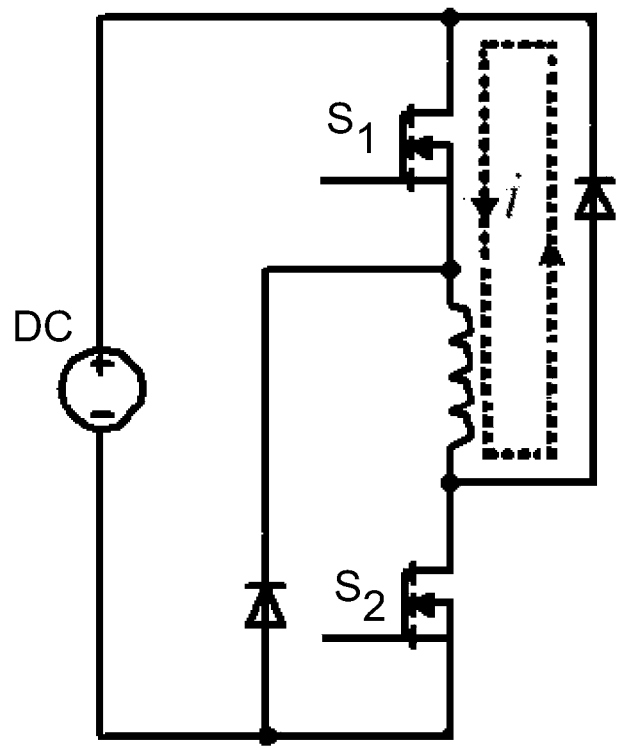
Figure 4

POSITION SENSORLESS STEP-WISE FREEWHEELING CONTROL METHOD FOR SWITCHED RELUCTANCE MOTOR

FIELD OF THE INVENTION

The present invention relates to a position sensorless control method for switched reluctance motor, which utilizes step-wise freewheeling and is applicable to switched reluctance motor systems that have different number of phase and employ dual switched-mode power converters for each phase.

BACKGROUND OF THE INVENTION

Switched reluctance motors have simple and robust structure, and are suitable for use in harsh industrial environments; however, the existence of position sensors results in severely reduced motor reliability, increased motor cost and system complexity. Moreover, since position sensors can not be mounted in some domains (e.g., compressor applications), the applicability of switched reluctance motors is severely limited. Therefore, it is an inexorable trend to implement control without position sensor in the development of switched reluctance motors. A variety of controlling methods without position sensor have been put forward at home and abroad. For example, measure the flux linkage characteristic or inductance characteristic of a given motor in online or offline mode, establish a motor model in the form of a table, fitting function, or neural network and store the motor model in a controller, measure the flux linkage or inductance of the motor in real time during the motor operates, and deduce the rotor position through the model in conjunction with the present phase current. Since the given motor is required to be modeled in advance in this method, the universality of the method is limited; in addition, to measure the flux linkage (or inductance) in the modeling process or operation process, data acquisition and computation has to be carried out for a number of variables, resulting in error accumulation and degraded position detection accuracy; moreover, the detection error will be increased since the model is susceptible to the impact of motor aging. The rotor position at the end position of minimum phase inductance can be obtained through phase current gradient method by detecting the peak phase current in the inductance rising zone; that method is not suitable for phase current chopping control; the ON-OFF angle adjustment range is limited, and the speed adjustment range is reduced during angular position control.

SUMMARY OF THE INVENTION

To overcome the drawbacks in the prior art, the present invention provides position sensorless step-wise freewheeling control method for switched reluctance motor, which detects the rotor position at the start position of minimum phase inductance of a phase, takes the rotor position directly as the switch-on position for the main switch of the phase in the power converter of the switched reluctance motor, and thereby switches on the upper tube and lower tube of the main switch of the phase in the power converter.

The position sensorless step-wise freewheeling control method for switched reluctance motor in the present invention comprises power supply, windings of a switched reluctance motor, and a power converter composed of main switch and diodes, taking an upper tube S1 and a lower tube S2 in the power converter of the main switch of a phase into OFF state, so that the winding for the phase in the switched reluctance motor enters into DC negative voltage forced freewheeling state, wherein, 1) setting a threshold for the winding current of the phase, and detecting the winding current i of the phase;

2) switching on the lower tube S2 or upper tube S1 in the power converter of the main switch of the phase when the winding current i of the phase drops to the preset threshold, so that the winding of the phase in the switched reluctance motor enters into zero voltage natural freewheeling state and the winding current i of the phase begins to rise up;

3) the rotor position of the switched reluctance motor is the start position b of minimum phase inductance of the phase when the winding current i of the phase rises up to the peak value, acquiring the start position b of minimum phase inductance of the phase, directly taking the acquired value as the switch-on position $\theta_1$ of the main switch of the phase in the power converter of switched reluctance motor, and switching on the upper tube S1 and lower tube S2 of the main switch in the power converter.

Beneficial effects: the present invention does not require any additional external hardware and does not have to store flux linkage data of the motor; for a switched reluctance motor system that employs dual switched-mode power converters for each phase, after the upper tube and lower tube of the main switch of a phase in the power converter are switched off, the phase enters into negative voltage forced freewheeling state in the switched reluctance motor; by detecting the phase current, the upper tube and lower tube of the main switch of the phase in the power converter are switched on when the phase current falls to a preset threshold, and the phase of the switched reluctance motor enters into zero voltage natural freewheeling state, and the phase current begins to rise up; when the phase current reaches to the peak value, the rotor position is the start position of minimum phase inductance of the phase, which is directly used as the switch-on position of the main switch of the phase in the power converter of the switched reluctance motor, and the upper tube and lower tube of the main switch of the phase in the power converter are switched on; thus, no rotor-position sensor is required. There is no restriction on the controlling approach, i.e. phase current chopping control, angular position control, and PWM control can be implemented. The present invention has high real-time feature, high dynamic response and stability, and high practicability and universality; therefore, the present invention has wide application prospects. The present invention is of great significance for expanding the application domain of switched reluctance motor systems and improving the operational reliability of switched reluctance motors.

BRIEF DESCRIPTION OF THE DRAWINGS

FIG. 1 is a schematic diagram of the freewheeling path of a current phase in the switched reluctance motor system in the present invention after the phase enters into negative voltage forced freewheeling state;

FIG. 2 is a schematic diagram of the freewheeling path of a current phase in the switched reluctance motor system in the present invention after the lower tube S2 of the main switch of the phase is switched on and the phase enters into zero voltage natural freewheeling state;

FIG. 3 is a schematic diagram of the characteristics of phase inductance L and phase current i in the present invention;

FIG. 4 is a schematic diagram of the freewheeling path of a current phase in the switched reluctance motor system in the present invention after the upper tube S1 of the main switch of the phase is switched on and the phase enters into zero voltage natural freewheeling state.

DETAILED DESCRIPTION OF THE EMBODIMENTS

Hereunder the present invention will be detailed in embodiments with reference to the accompanying drawings:

Embodiment 1

A Switched Reluctance Motor System that Employs Dual Switched-Mode Power Converters for Each Phase The system employs power supply, windings of a switched reluctance motor, and a power converter composed of main switch and diodes, wherein, the upper tube S1 and lower tube S2 for the main switch of a phase in the power converter are switched off, and the phase of the switched reluctance motor enters into DC negative voltage forced freewheeling state; a threshold is set for the winding current of the phase, and the phase current i is detected; the freewheeling path of the phase current i is shown in FIG. 1.

When the winding current i of the phase falls to the preset threshold, the lower tube S2 of the main switch of the phase in the power converter is switched on, and the phase in the switched reluctance motor enters into zero voltage natural freewheeling state, and the phase current i begins to rise up, the freewheeling path of phase current i is shown in FIG. 2.

When the winding current i of the phase reaches to the peak value, the rotor position of the switched reluctance motor is the start position b of minimum phase inductance of the phase; the start position b of minimum phase inductance of the phase is acquired, and is used directly as the switch-on position $\theta_1$ for the main switch of the phase in the power converter of the switched reluctance motor, without any rotor-position sensor, and the upper tube S1 and lower tube S2 of the main switch of the phase in the power converter are switched on, The characteristics of phase inductance L and phase current i are shown in FIG. 3. The rotor position c at the end position of minimum phase inductance of the phase is shown in FIG. 3.

Embodiment 2

A Switched Reluctance Motor System that Employs Dual Switched-Mode Power Converters for Each Phase The system employs power supply, windings of a switched reluctance motor, and a power converter composed of main switch and diodes, wherein, the upper tube S1 and lower tube S2 of the main switch of a phase in the power converter are switched off, and the phase of the switched reluctance motor enters into DC negative voltage forced freewheeling state; a threshold is set for the winding current of the phase, and the phase current i is detected; the freewheeling path of the phase current i is shown in FIG. 1.

When the winding current i of the phase falls to the preset threshold, the upper tube S1 for the main switch of the phase in the power converter is switched on, and the phase of the switched reluctance motor enters into zero voltage natural freewheeling state, and the phase current i begins to rise up; the freewheeling path of phase current i is shown in FIG. 4.

When the winding current i of the phase reaches to the peak value, the rotor position of the switched reluctance motor is the start position b of minimum phase inductance of the phase; at that moment, the start position b of minimum phase inductance of the phase is acquired, and is used directly as the switch-on position $\theta_1$ for the main switch of the phase in the power converter of the switched reluctance motor, without any rotor-position sensor, and the upper tube S1 and lower tube S2 of the main switch of the phase in the power converter are switched on, The characteristics of phase inductance L and phase current i are shown in FIG. 3. The rotor position c at the end position of minimum phase inductance of the phase is shown in FIG. 3.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiments of the invention; however, concepts, as based upon the description, may be employed in other embodiments without departing from the scope of the invention. The invention is not otherwise limited, except for the recitation of the claims set forth below.

The invention claimed is:

1. A position sensorless step-wise freewheeling control method for a switched reluctance motor, including a power supply, windings of a switched reluctance motor, and a power converter including a main switch and diodes with an upper tube S1 and a lower tube S2 in the power converter of the main switch of a phase in an OFF state and the winding of the phase in the switched reluctance motor in DC negative voltage forced freewheeling state, comprising the steps of:
   setting a threshold for a winding current of the phase, and detecting the winding current i of the phase;
   switching on either the lower tube S2 or the upper tube S1 in the power converter of the main switch of the phase when the winding current i of the phase drops to a preset threshold, so that the winding of the phase in the switched reluctance motor changes into a zero voltage natural freewheeling state and the winding current i of the phase begins to rise up; and
   when the rotor position of the switched reluctance motor is a start position b of minimum phase inductance of the phase when the winding current i of the phase rises up to a peak value, acquiring the start position b of minimum phase inductance of the phase, taking the acquired value as the switch-on position $\theta_1$ of the main switch of the phase in the power converter of switched reluctance motor, and switching on the upper tube S1 and lower tube S2 of the main switch in the power converter.

2. The method of claim 1 wherein said switching step switches on the lower tube S2.

3. The method of claim 1 wherein said switching step switches on the upper tube S1.

4. A method of controlling a switched reluctance motor to attain a position sensorless step-wise freewheeling control, the switched reluctance motor including a power supply, windings, and a power converter including a main switch and diodes with an upper tube S1 and a lower tube S2 in the power converter of the main switch of a phase in an OFF state and the winding of the phase in the switched reluctance motor in DC negative voltage forced freewheeling state, comprising the steps of:
   setting a threshold for a winding current of the phase, and detecting the winding current i of the phase; and switching on either the lower tube S2 or upper tube S1 in the power converter of the main switch of the phase when the winding current i of the phase drops to a preset threshold, so that the winding of the phase in the switched reluctance motor enters into zero voltage natural freewheeling state and the winding current i of the phase begins to rise up.

5. The method of claim 4 further comprising the step of:

acquiring the start position b of minimum phase inductance of the phase when the rotor position of the switched reluctance motor is a start position b of minimum phase inductance of the phase when the winding current i of the phase rises up to a peak value.

6. The method of claim 5 further comprising the step of:

taking the acquired value as the switch-on position $\theta_1$ of the main switch of the phase in the power converter of switched reluctance motor, and switching on the upper tube S1 and lower tube S2 of the main switch in the power converter.

7. A method of attaining a position sensorless step-wise freewheeling control of a switched reluctance motor including a power supply, windings, and a power converter including a main switch and diodes, an upper tube S1 and a lower tube S2 for the main switch of a phase in the power converter being movable between an ON state and an OFF state, comprising the steps of:

placing the upper tube S1 and the lower tube S2 into the OFF state, whereby the phase of the switched reluctance motor enters into a DC negative voltage forced freewheeling state;

setting a threshold for the winding current of the phase;

detecting the phase current; and when the winding current i of the phase drops to a preset threshold, switching either the lower tube S2 or upper tube S1 into the ON state so that the phase in the switched reluctance motor enters into a zero voltage natural freewheeling state and the phase current begins to rise.

8. The method of claim 7 further comprising the step of:

when the winding current i of the phase rises up to a peak value, equating the rotor position of the switched reluctance motor to a start position b of a minimum phase inductance of the phase so that the start position b of minimum phase inductance of the phase becomes an acquired value.

9. The method of claim 8 further comprising the step of:

taking the acquired value as the switch-on position $\theta_1$ of the main switch of the phase in the power converter of switched reluctance motor, and moving both the upper tube S1 and lower tube S2 of the main switch in the power converter into the ON state.

10. The method of claim 9 wherein said switching step places only the upper tube S1 into the ON state.

11. The method of claim 9 wherein said switching step places only the lower tube S2 into the ON state.

* * * * *